United States Patent [19]

Kagami et al.

[11] Patent Number: 5,341,349
[45] Date of Patent: Aug. 23, 1994

[54] MAGNETOOPTICAL RECORDING MEDIUM HAVING IMPROVED SENSITIVITY

[75] Inventors: Nobutake Kagami; Yuichiro Doi; Yuko Nakamura, all of Miyagi, Japan

[73] Assignee: Sony Corporation, Tokyo, Japan

[21] Appl. No.: 981,537

[22] Filed: Nov. 25, 1992

[30] Foreign Application Priority Data

Nov. 30, 1991 [JP] Japan ................... 3-342326

[51] Int. Cl.⁵ ........................................ G11B 11/00
[52] U.S. Cl. ............................... 369/13; 369/288; 369/275.2; 360/59
[58] Field of Search ............ 369/13, 288, 286, 275.2, 369/275.4, 275.5, 284; 360/131, 135, 59, 114; 365/122; 428/694, 900, 336, 692, 698, 704

[56] References Cited

U.S. PATENT DOCUMENTS 5,132,945 7/1992 Osato et al. ..................... 369/13
5,228,024 7/1993 Moon et al. ..................... 369/288
5,232,790 8/1993 Arimune et al. ................. 428/694

Primary Examiner—Robert J. Pascal
Assistant Examiner—Ali Neyzari
Attorney, Agent, or Firm—Hill, Steadman & Simpson

[57] ABSTRACT

A magneto-optical recording medium comprises, at least a transparent base plate, a dielectric layer formed on one major surface of the transparent base plate, and a recording magnetic layer formed over the dielectric layer. The dielectric layer may be a single-layer structure consisting of a dense dielectric film or may be a two-layer structure consisting of a porous dielectric film formed contiguously with the transparent base plate, and a dense dielectric film formed contiguously with the recording magnetic layer. The magneto-optical recording medium has high recording magnetic field sensitivity and excellent mechanical properties, and is capable of satisfactorily functioning for recording/reading operation on either a magnetic modulation recording system or an optical modulation recording system.

2 Claims, 5 Drawing Sheets

MAGNETOOPTICAL RECORDING MEDIUM HAVING IMPROVED SENSITIVITY

BACKGROUND OF THE INVENTION

1. Field of the Invention

The present invention relates to a magneto-optical recording medium suitable for recording information thereon on a magnetic modulation recording system.

2. Description of the Prior Art

A magneto-optical recording method heats a magnetic thin film locally at a temperature beyond the Curie point or the compensation temperature to extinguish the coercive force of the heated portion of the magnetic thin film, and applies an external recording magnetic field to the heated portion to invert the direction of magnetization of the heated portion in the direction of the recording magnetic field. The magneto-optical recording method has been practically applied to external storages for optical filing systems and computers, sound recording apparatuses and video recording apparatuses.

A known magneto-optical recording medium for use in carrying out the magneto-optical recording method consists of a transparent base plate formed of polycarbonate or the like, and a laminate recording layer formed on one major surface of the transparent base plate by sequentially superposing a recording magnetic layer having an easy direction of magnetization perpendicular to the surface thereof and a high magneto-optical effect, such as a thin film of an amorphous alloy of a rare earth metal and a transition metal, a reflecting layer and a dielectric layer. A laser beam is projected on the magneto-optical recording medium from the side of the other major surface of the transparent base plate when reading signals recorded on the magneto-optical recording medium.

Magneto-optical recording methods are classified roughly into optical modulation recording methods and magnetic modulation recording methods. Magnetic modulation recording methods are expected to be potential magneto-optical recording methods owing to their overwriting capability.

The magnetic modulation recording method writes information on a magnetic thin film by inverting a magnetic field applied to the magnetic thin film at a high frequency. The magnetic modulation recording method, in general, uses a magnetic head provided with a magnetic field creating means capable of magnetic field inversion, such as a coil or the like. A magnetic head capable of applying a high-frequency inverting magnetic field to the magnetic thin film is able to create only a magnetic field of a very low intensity on the order of 100 Oe due to various restrictions, and the magnitude of the magnetic field decreases with recording frequency due to increase in the temperature of the coil. Accordingly, a magneto-optical recording medium to be used by the magnetic modulation recording method is required to be capable of stably recording signals even if the intensity of the magnetic field is not higher than 100 Oe. However, the sensitivity of the conventional magneto-optical recording medium is not high enough to record signals by using a low-intensity magnetic field having a field intensity on the order of 100 Oe, and even a slight variation in the distance between the magnetic head and the magneto-optical recording medium will cause a drop-out of recording signals. Particularly, when the magneto-optical recording medium is used on a recording/reading apparatus liable to be exposed to vibrations and shocks, such as an automotive audio apparatus or the like, the practical characteristics of the magneto-optical recording medium is unsatisfactory. Thus, the magneto-optical recording medium is unsuitable for the magnetic modulation recording method.

SUMMARY OF THE INVENTION

The present invention has been made in view of the foregoing problems in the prior art and it is therefore an object of the present invention to provide a magneto-optical recording medium capable of enabling stable signal recording by either a magnetic modulation recording method or an optical modulation recording method.

The inventors of the present invention made studies to improve the sensitivity of a magneto-optical recording medium by reducing the coercive force of the recording magnetic layer of the magneto-optical recording medium and have made the present invention on the basis of the facts found through the studies that the coercive force of the recording magnetic layer is greatly dependent on the density of a dielectric layer underlying the recording magnetic layer. The coercive force is low when the density of the dielectric layer is high and stable recording can be achieved even by a recording magnetic field of a low field intensity when the coercive force of the recording magnetic field is reduced.

A magneto-optical recording medium in one aspect of the present invention comprises a transparent base plate, and a laminate recording layer formed on one major surface of the transparent base plate and comprised of at least a recording magnetic layer and a dielectric layer underlying the recording layer, wherein the dielectric layer is formed by a compact dielectric film which is capable of being etched at an etching rate of 20 Å/min or below with a 5% hydrofluoric acid buffer solution at 25° C.

In a second aspect of the present invention, the dielectric layer underlying the recording magnetic layer has a multilayer construction and comprises a porous dielectric film capable of being etched at an etching rate of 40 Å/min or above with a 5% hydrofluoric acid buffer solution at 25° C., and a dense dielectric film capable of being etched at an etching rate of 20 Å/min or below with a 5% hydrofluoric acid buffer solution at 25° C., and the porous dielectric film and the dense dielectric film are arranged so that the dense dielectric film is contiguous to the recording magnetic layer.

The dense dielectric film contiguous to the recording magnetic layer reduces the coercive force of the recording magnetic layer and the internal stress of the dielectric layer is reduced by the porous dielectric films to enhance both the recording sensitivity and mechanical strength of the magneto-optical recording medium.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
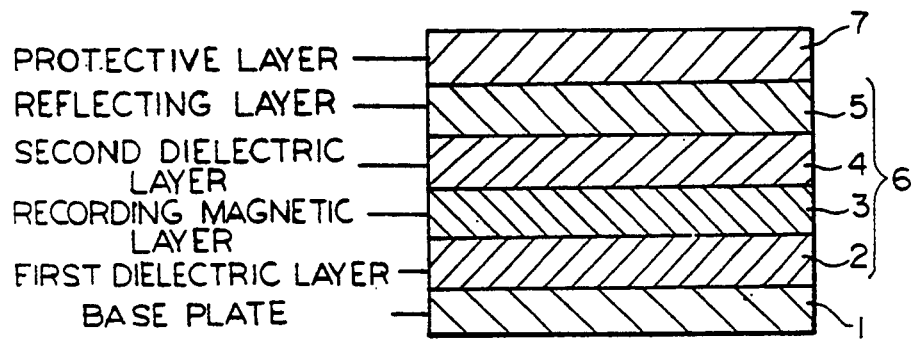
FIG. 1 is a schematic sectional view of an essential portion of a magneto-optical disk in a first embodiment according to the present invention.

A magneto-optical disk in accordance with the present invention comprises a transparent base plate, a dielectric layer formed on one major surface of the transparent base plate, and a recording magnetic layer formed over the dielectric layer. The base plate is a transparent, circular plate of about 1 millimeter in thickness and formed of a synthetic resin, such as an acrylic resin, a polycarbonate resin, a polyolefine resin or an epoxy resin, or glass.

Preferably, the recording magnetic layer is formed by an amorphous magnetic thin film having an easy direction of magnetization perpendicular to its surface, excellent magneto-optical characteristics, a high coercive force at room temperature, and a Curie point of about 200° C. A suitable material capable of forming an amorphous magnetic thin film meeting such requirements is an amorphous alloy of a rare earth metal or metals, and a transition metal or metals, such as an amorphous TbFeCo alloy.

Such an amorphous magnetic thin film may be formed by a vacuum thin film forming process, such as a sputtering process or a molecular beam epitaxial process having a thickness in a range of about 100 to about 1000 Å to make the amorphous magnetic thin film attain practical magneto-optical characteristics. An additive element, such as Cr, Pt and Ti may be added to the recording magnetic layer to improve its corrosion resistance.

The dielectric layer is formed between the base plate and the recording magnetic layer to improve the corrosion resistance and to increase the Kerr's rotation angle by multipath reflection for the enhancement of the Kerr effect.

Suppose that the coercive force of the recording magnetic layer is reduced adequately when the recording magnetic layer is irradiated with a laser beam. Then, it is important to achieve recording at a high sensitivity that the dielectric layer formed between the base plate and the recording magnetic layer is capable of being etched at an etching rate of 20 Å/min or below by a 5% hydrofluoric acid buffer solution at 25° C. The etching rate at which the dielectric layer is etched by the hydrofluoric acid buffer solution under such conditions represents the density of the dielectric layer; that is, the etching rate decreases with increase in the density of the dielectric layer, and a dielectric layer capable of being etched at an etching rate of 20 Å/min or below is very compact.

The coercive force of the recording magnetic layer is dependent on the density of the film underlying the recording magnetic layer; that is, the higher the density of the film underlying the recording magnetic layer, the easier the inversion of magnetization and lower the coercive force of the recording magnetic layer. Accordingly, the coercive force of the recording magnetic layer is reduced and signals can be stably recorded on the magneto-optical recording medium when a dielectric layer capable of being etched at an etching rate of 20 Å/min or below under the foregoing etching conditions is contiguous to the recording magnetic layer. Furthermore, the dense dielectric layer enhances the capability of the magneto-optical recording medium in preventing the penetration of moisture and $O_2$ into the component layers and the corrosion resistance of the magneto-optical recording medium.

If the density of the dielectric layer is excessively high, it is possible that an increased stress is induced in the dielectric layer which can crack the recording magnetic layer or can cause the base plate to warp. Therefore, in the second aspect of the present invention, the dielectric layer is a multilayer structure formed of a porous dielectric film capable of being etched at an etching rate of 40 Å/min or above by a 5% hydrofluoric acid buffer solution at 25° C. and a dense dielectric film capable of being etched at an etching rate of 20 Å/min or below by the same etchant at 25° C., and the dense dielectric film is formed contiguously with the recording magnetic layer. The coercive force of the recording magnetic layer is reduced by the dense dielectric film directly underlying the recording magnetic layer, the internal stress of the dielectric layer is reduced by the porous dielectric film and, consequently, both the recording sensitivity and the mechanical properties of the magneto-optical recording medium can be improved.

Suitable materials for forming the dielectric layer are nitrides, such as $Si_3N_4$ and AlN, and oxides, such as $SiO_2$ and $Al_2O_3$. Preferably, the dielectric layer is formed of a material not containing oxygen and sufficiently transmissive to the working laser beam, such as silicon nitride or aluminum nitride. The dielectric films are formed by depositing an oxide, a nitride or an oxynitride by a vacuum thin film forming process. If a sputtering process is employed in forming the dielectric films, the density of the dielectric films can be regulated by regulating the pressure of the sputtering gas and the sputtering power. Preferably, the thickness of the dielectric layer is in a range of 50 to 2,000 Å in order to provide the dielectric layer with a sufficiently high Kerr's rotation angle increasing effect and a sufficiently high oxidation preventing effect.

The magneto-optical recording-medium may be provided further with a dielectric layer, a reflecting layer, a protective layer and the like on the recording magnetic layer.

The dielectric layer overlying the recording magnetic layer, similarly to the dielectric layer underlying the recording magnetic layer, may be a dense dielectric layer. However, the dielectric layer overlying the recording magnetic layer hardly contributes to the reduction of the coercive force of the recording magnetic layer, even if the dielectric layer has a high density. Accordingly, the density of the dielectric layer overlying the recording magnetic layer need not be particularly high and hence the same dielectric layer may be formed under ordinary film forming conditions.

The reflecting layer reflects the laser beam penetrating the recording magnetic layer to increase the Kerr's rotation angle by the combined effect of the Kerr effect and the Faraday effect. The reflecting layer is formed by depositing a nonmagnetic metal having a high thermal conductivity by evaporation. In view of availability and thermal conductivity, aluminum is a suitable material for forming the reflecting layer.

The protective layer protects the recording magnetic layer from the impingement of external matters upon the recording magnetic layer and the corrosive action of the ambient on the same. The protective layer is formed, for example, by coating the recording magnetic layer with an ultraviolet-hardening resin by a spin coater. There is not any particular restriction on the material for forming the protective layer; any material capable of being applied to the recording magnetic layer by a spin coater and which hardens to form a film having a sufficient strength may be used. Generally, the protective layer is formed of an ultraviolet-hardening resin.

The dense dielectric layer formed on the transparent base plate and underlying the recording magnetic layer, i.e., the dielectric layer capable of being etched at an etching rate of 20 Å/min or below by a 5% hydrofluoric acid buffer solution at 25° C., reduces the coercive force of the recording magnetic layer to enable a recording magnetic field of a low intensity to achieve stable signal recording, which is inferred to be due to the following reasons.

If a coarse dielectric layer is formed under the recording magnetic layer, atoms of the material forming the recording magnetic layer penetrate the dielectric layer to make the distribution of domain wall energy fluctuate. Consequently, domain wall displacement by a magnetic field becomes difficult and hence the recording magnetic layer has a high coercive force.

If a dense dielectric layer is formed under the recording magnetic layer, atoms of the material forming the recording magnetic layer scarcely penetrate the dielectric layer scarcely, and hence domain wall displacement occurs easily. Consequently, the recording magnetic layer has a low coercive force and the direction of magnetization can be easily inverted by a recording magnetic field of a low intensity to achieve stable signal recording.

In a second aspect of the present invention, the dielectric layer is a multilayer structure formed of the porous dielectric film capable of being etched at an etching rate of 40 Å/min or above by a 5% hydrofluoric acid buffer solution at 25° C. and the dense dielectric film capable of being etched at an etching rate of 20 Å/min or below by the same etchant at 25° C. so that one of the dense dielectric films is contiguous to the recording magnetic layer. If the density of the dielectric layer is excessively high, an increased stress is induced in the dielectric layer to crack the recording magnetic layer, or to cause the base plate to warp. However, the porous dielectric film reduces the internal stress of the dielectric layer to prevent the foregoing troubles and to provide a magneto-optical recording medium having excellent mechanical properties.

Examples of magneto-optical recording media embodying the present invention will be described in terms of their characteristics determined through experiments.

EXPERIMENT 1

In experiment 1, the relation between the density of the dielectric layer of a magneto-optical disk, formed by a dc reactive sputtering process and recording sensitivity of the magneto-optical recording disk, was examined.

Referring to FIG. 1, each of magneto-optical disks subjected to experiment 1 comprises a polycarbonate base plate 1, a four-layer recording layer formed on the base plate 1 and formed of a 1100 Å thick first dielectric layer 2 of $Si_3N_4$, a 230 Å thick recording magnetic layer 3 of TbFeCo, a 400 Å thick second dielectric layer 4 of $Si_3N_4$ and a 600 Å thick reflecting layer 5 of Al, and a protective layer 7 of an ultraviolet-hardening resin formed over the recording layer 6.

In fabricating the magneto-optical disk, the first dielectric layer 2 of $Si_3N_4$ was formed on the base plate 1 by adc magnetron reactive sputtering process using a phosphorous-doped Si target, and then the recording magnetic layer 3 of TbFeCo, the second dielectric layer 4 of $Si_3N_4$ and the reflecting layer 5 of Al were formed sequentially in that order on the first dielectric layer 2 by sputtering. Then, the four-layer recording layer 6 was coated with the protective layer 7 of the ultraviolet-hardening resin.

Three magneto-optical disks, i.e., a sample 1, a sample 2 and a comparative sample 1 were thus fabricated. The samples 1 and 2 and the comparative sample 1 differ from each other in the density and etching resistance of their first dielectric layers 2 of $Si_3N_4$. Those first dielectric layers 2 respectively having different densities were formed by varying the pressure of the sputtering gas. Process conditions and etching rates at which the first dielectric layers 2 are etched by a 5% hydrofluoric acid buffer solution, i.e., a buffer solution of hydrofluoric acid concentration of 5% prepared by mixing pure water and a mixed acid containing 100 parts of ammonium fluoride and 12 parts of hydrogen fluoride, at 25° C. are shown in Table 1.

TABLE 1

|  | Sputtering conditions | | | | Etching rate (Å/min) |
| --- | --- | --- | --- | --- | --- |
|  | Pressure (Pa) | Power (kW) | Ar gas (sccm) | $N_2$ gas (sccm) |  |
| Sample 1 | 0.25 | 4.0 | 33.0 | 47.0 | 11.5 |
| Sample 2 | 0.50 | 4.0 | 41.0 | 39.0 | 14.5 |
| Comp. sample 1 | 1.0 | 4.0 | 60.0 | 20.0 | 326 |

The second dielectric layer 4 of $Si_3N_4$ was formed by a dc magnetron sputtering process, in which sputtering conditions were: Ar gas supply rate: 41 sccm, $N_2$ gas supply rate: 39.0, Gas pressure: 0.50 Pa and sputtering power: 4.0 kW. The recording magnetic layer 3 and the reflecting layer 5 were formed by dc magnetron sputtering processes respectively using a TbFeCo alloy target and an Al target. The dc magnetron sputtering processes were carried out by a focusing target sputtering system.

Figure 2:
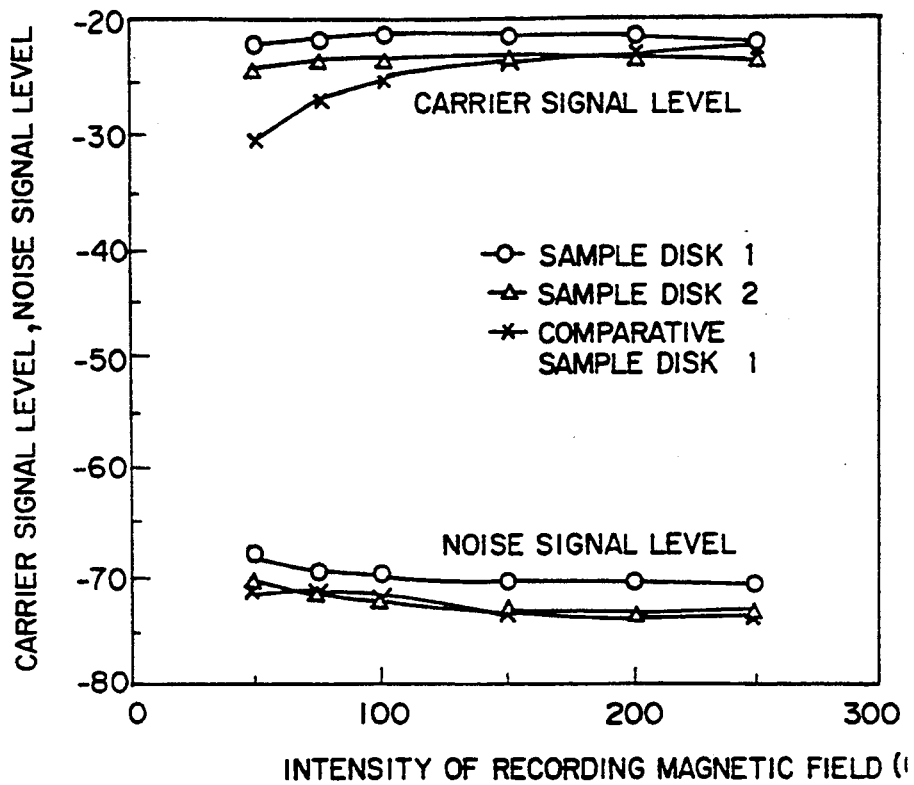
FIG. 2 is a graph showing the variation of carrier signal level and noise signal level with the intensity of an external recording magnetic field for magneto-optical disks each having a first dielectric layer formed by a dc reactive sputtering process.
Figure 3:
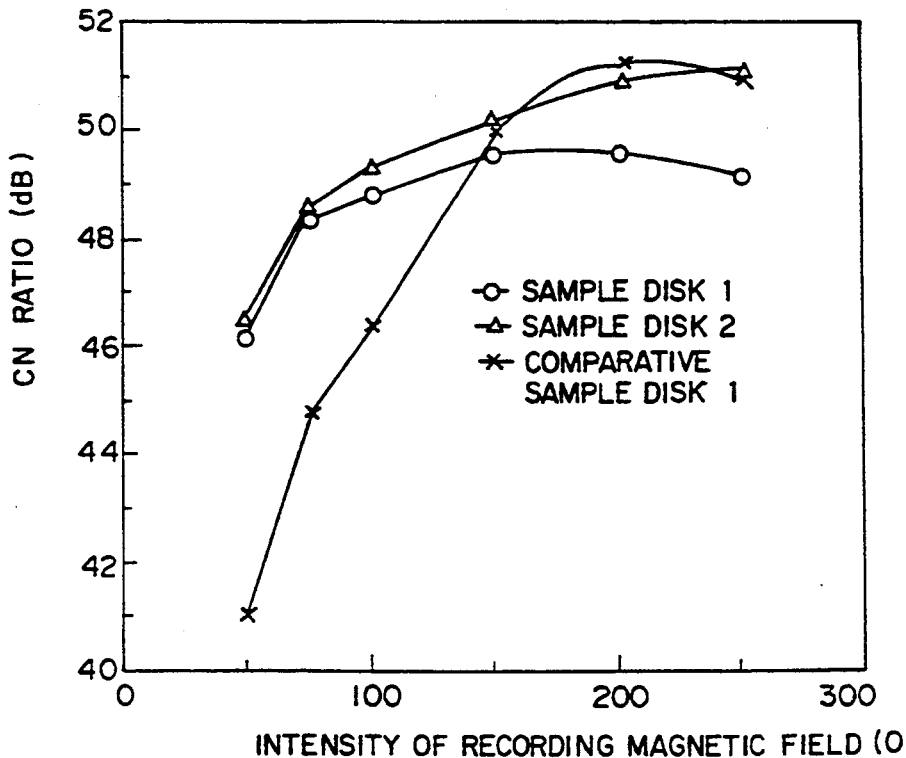
FIG. 3 is a graph showing the variation of CN ratio with the intensity of external recording magnetic field for magneto-optical disks each having a first dielectric layer formed by a dc reactive sputtering process.

The sample magneto-optical disks were subjected to magnetic modulation recording tests, in which recording magnetic fields of different intensities were applied to the sample magneto-optical disks, carrier level and noise level were measured and recording sensitivity were examined. Measured carrier level and noise level are shown in FIG. 2 and the CN ratio is shown in FIG. 3. In the signal recording tests, the recording frequency was 720 kHz and the line speed was 1.35 m/sec.

As is obvious from FIGS. 2 and 3, the CN ratios for the samples 1 and 2 having first dielectric layers 2 of $Si_3N_4$ which are etched, respectively, at etching rates lower than 20 Å/min are higher than 49 dB when the intensity of the recording magnetic field is as small as 100 Oe, which is practically sufficiently high.

The intensity of the recording magnetic field at which the carrier level for the comparative sample 1 saturate is relatively high and the CN ratio for the comparative sample 1 is not practically high enough when the intensity of the recording magnetic field is on the order of 100 Oe.

EXPERIMENT 2

In experiment 2, the relation between the density of the dielectric layer of a magneto-optical disk, formed by a radio-frequency reactive sputtering process and recording sensitivity of the same was examined.

Samples of magneto-optical disks subjected to experiment 2 were substantially the same in construction as those subjected to experiment 1, except that the dielectric layers of $Si_3N_4$ of the samples were formed by a high-frequency magnetron reactive sputtering process using a Si target. Five kinds of sample magneto-optical disks, i.e., a sample 3, a sample 4, a sample 5, a comparative sample 2 and a comparative sample 3, were fabricated. Process conditions and etching rates at which the first dielectric layers are etched, respectively, by a 5% hydrofluoric acid buffer solution at 25° C. are shown in Table 2.

TABLE 2

|  | Sputtering conditions | | | | Etching rate (Å/min) |
| --- | --- | --- | --- | --- | --- |
|  | Pressure (Pa) | Power (kW) | Ar gas (sccm) | $N_2$ gas (sccm) |  |
| Sample 3 | 0.25 | 4.0 | 60.0 | 20.0 | 8.9 |
| Sample 4 | 0.40 | 4.0 | 62.0 | 18.0 | 11.0 |
| Sample 5 | 0.50 | 4.0 | 64.0 | 16.0 | 17.0 |
| Camp. sample 2 | 0.70 | 4.0 | 68.0 | 12.0 | 89.0 |
| Camp. sample 3 | 1.0 | 4.0 | 70.0 | 10.0 | 450 |

The respective second dielectric layers of the sample magneto-optical disks were formed by a sputtering process under process conditions: Ar gas supply rate: 64 sccm, $N_2$ gas supply rate: 16 sccm, pressure of the sputtering gas: 0.50 Pa and sputtering power: 4 kW.

Figure 4:
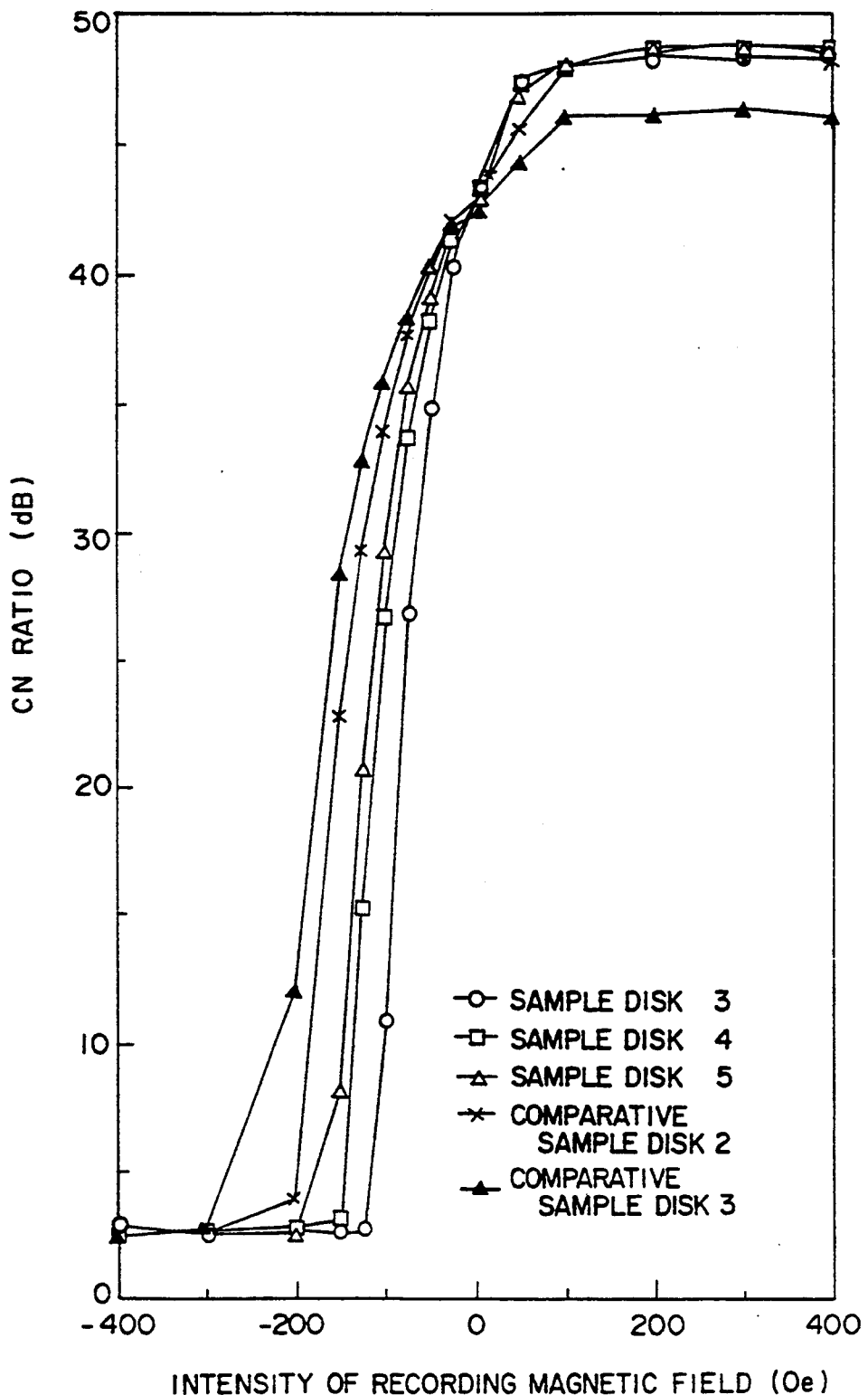
FIG. 4 is a graph showing the variation of CN ratio with the intensity of the external recording magnetic field for magneto-optical disks each having a first dielectric layer formed by a dc reactive sputtering process.

The recording sensitivity of the sample magneto-optical disks in optical modulation recording were examined. FIG. 4 shows the variation of CN ratio with the intensity of an external recording magnetic field for the sample magneto-optical disks. In recording signals, recording frequency was 4.93 MHz, pulse width was 51 nsec, rotating speed of the magnet optic disks was 2400 rpm and measuring radius was 30 mm.

As is obvious from FIG. 4, CN ratios for the samples 3, 4 and 5 having first dielectric layers of $Si_3N_4$ which are etched at etching rates not greater than 20 Å/min are practically adequate even if the intensity of the recording magnetic field applied thereto in an optical modulation mode is as low as 100 Oe, and CN ratios for the comparative samples 2 and 3 having first dielectric layers of $Si_3N_4$ which are etched at etching rates not smaller than 20 Å/min are practically inadequate when the intensity of the recording magnetic field is on the order of 100 Oe.

As is obvious from the foregoing experimental results, it is effective for enhancing the recording magnetic field sensitivity of a magneto-optical disk to form the first dielectric layer of the magneto-optical disk by a dielectric film capable of being etched at an etching rate of 20 Å/min or below by a 5% hydrofluoric acid buffer solution at 25° C., the recording magnetic field sensitivity enhancing effect of the dielectric film formed by a dc reactive sputtering process and that of the dielectric film formed by a radio-frequency reactive sputtering process are the same, and the present invention is applicable to any suitable magneto-optical disk fabricating methods.

EXPERIMENT 3

If the density of the first dielectric layer is excessively high, the dielectric layer is cracked or the base plate is caused to warp. Such a problem is inferred to be due to the relatively high internal stress of the relatively dense first dielectric layer. It is expected that such a problem will be solved if the first dielectric layer is formed in a two-layer construction consisting of a relatively dense dielectric film and a relatively porous dielectric film to reduce the overall internal stress of the dielectric layer.

In experiment 3, the internal stress and recording sensitivity of magneto-optical disks each provided with a first dielectric layer consisting of a relatively dense dielectric film capable of being etched at a relatively low etching rate and a relatively porous dielectric film capable of being etched at a relatively high etching rate, and a recording magnetic layer contiguous to the relatively dense dielectric film capable of being etched at a relatively low etching rate.

Sample films 1, 2 and 3 of $Si_3N_4$ having different densities were formed under different sputtering gas pressures, respectively, on silicon wafers by adc magnetron reactive sputtering process to examine the relation between the density and the internal stress of the first dielectric layer. The process conditions and etching rates at which the sample films 1, 2 and 3 were etched by a 5% hydrofluoric acid buffer solution at 25° C. are shown in Table 3.

TABLE 3

|  | Sputtering conditions | | | | Etching rate (Å/min) | Internal stress ($10^9$ dyn/cm$^2$) |
| --- | --- | --- | --- | --- | --- | --- |
|  | Pressure (Pa) | Power (kW) | Ar gas (sccm) | $N_2$ gas (sccm) |  |  |
| Sample film 1 | 0.40 | 4.0 | 41.0 | 39.0 | 11.2 | 14.1 |
| Sample film 2 | 0.50 | 4.0 | 41.0 | 39.0 | 14.5 | 11.6 |
| Sample film 3 | 0.70 | 4.0 | 56.0 | 24.0 | 56.8 | −2.0 |

As is obvious from Table 3, the internal stress of the dielectric film of $Si_3N_4$ increases with the decrease of the etching rate. As is proved by experiments 2 and 3, the etching rate at which the dielectric film contiguous to the recording magnetic layer is etched under the foregoing etching conditions must be 20 Å/min or below. Sample films 1 and 2 among those shown in Table 3 meet such a requirement.

Two-layer dielectric layers consisting of repeated combinations of two of the three 550 Å thick sample films 1, 2 and 3 shown in Table 3, respectively, were formed and the internal stresses of the dielectric layers were measured. Measured internal stresses are shown in Table 4.

TABLE 4

| Upper film | Lower film | Internal stress ($10^9$ dyn/cm$^2$) |
| --- | --- | --- |
| Sample film 1 | Sample film 1 | 14.1 |
| | Sample film 2 | 12.6 |
| | Sample film 3 | 5.6 |
| Sample film 2 | Sample film 1 | 13.8 |
| | Sample film 2 | 11.6 |
| | Sample film 3 | 3.8 |
| Sample film 3 | Sample film 1 | 8.7 |
| | Sample film 2 | 7.9 |
| | Sample film 3 | −2.0 |

The internal stress of a dielectric layer consisting of the sample film 1 of $Si_3N_4$ as the upper dielectric film and the sample film 3 of $Si_3N_4$ as the lower dielectric film and the internal stress of a dielectric layer consisting of the sample film 2 of $Si_3N_4$ as the upper dielectric film and the sample film 3 of $Si_3N_4$ as the lower dielectric film are as small as $5.6 \times 10^9$ dyn/cm$^2$ and $3.8 \times 10^9$ dyn/cm$^2$, respectively. The quality of the dielectric layers using the sample film 3 as the lower dielectric layer was very satisfactory, any visible cracks were not formed in the same dielectric layers, and the base plates supporting the same dielectric layers were not warped.

Thus, the internal stress of the two-layer dielectric layer comprising the dense dielectric film capable of being etched at a relatively low etching rate and the porous dielectric film capable of being etched at a relatively high etching rate is lower than that of the single-layer dielectric layer comprising the dense dielectric film capable of being etched at a relatively high etching rate, and the two-layer dielectric layer is more satisfactory than the single-layer dielectric layer in mechanical properties.

The recording sensitivity of magneto-optical disks provided with the first dielectric layer consisting of a dielectric film capable of being etched at a relatively low etching rate and a dielectric film capable of being etched at a relatively high etching rate were examined.

Figure 5:
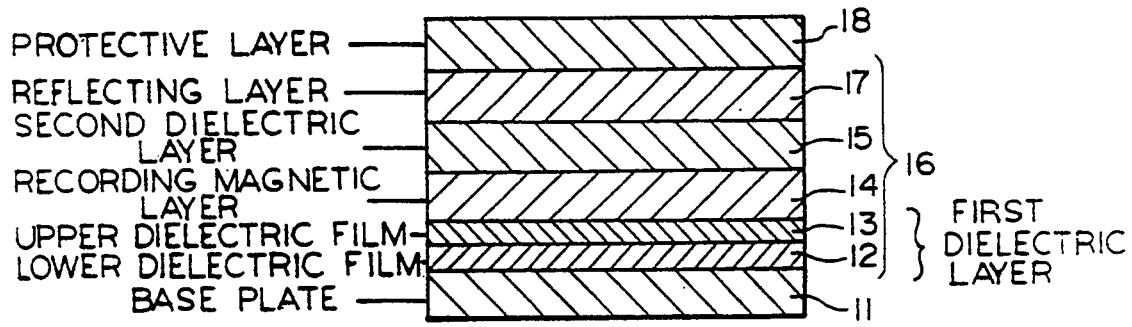
FIG. 5 is a schematic sectional view of an essential portion of a magneto-optical disk in a second embodiment according to the present invention.

Referring to FIG. 5, a magneto-optical disk comprises a polycarbonate base plate 11, a four-layer recording layer 16 formed on the base plate 11 and consisting of a first dielectric layer consisting of a 550 Å thick lower dielectric film 12 of $Si_3N_4$ and a 550 Å thick upper dielectric film 13 of $Si_3N_4$, a 230 Å thick recording magnetic layer 14 of TbFeCo, a 400 Å thick second dielectric layer 15 of $Si_3N_4$ and a 600 Å thick reflecting layer 17, and a protective layer 18 of an ultraviolet-hardening resin formed over the recording layer 16.

In fabricating this magneto-optical disk, the lower dielectric film 12 of $Si_3N_4$ was formed on the base plate 11 under the same sputtering conditions as those for forming the sample film 3, the upper dielectric film 13 of $Si_3N_4$ was formed over the lower dielectric film 12 under the same sputtering conditions as those for forming the first sample film 1 or the second film 2 to construct the first dielectric layer, and then the recording magnetic layer 14 of TbFeCo, the second dielectric layer 15 of $Si_3N_4$, the reflecting layer 17 of Al and the protective layer 18 of the ultraviolet-hardening resin were formed sequentially under the process conditions similar to those employed in experiment 1. The process conditions were controlled to fabricate sample disks 6 and 7, and a comparative sample disk 4 having an upper dielectric film of $Si_3N_4$ formed under the sputtering conditions for forming the sample film 3.

Figure 6:
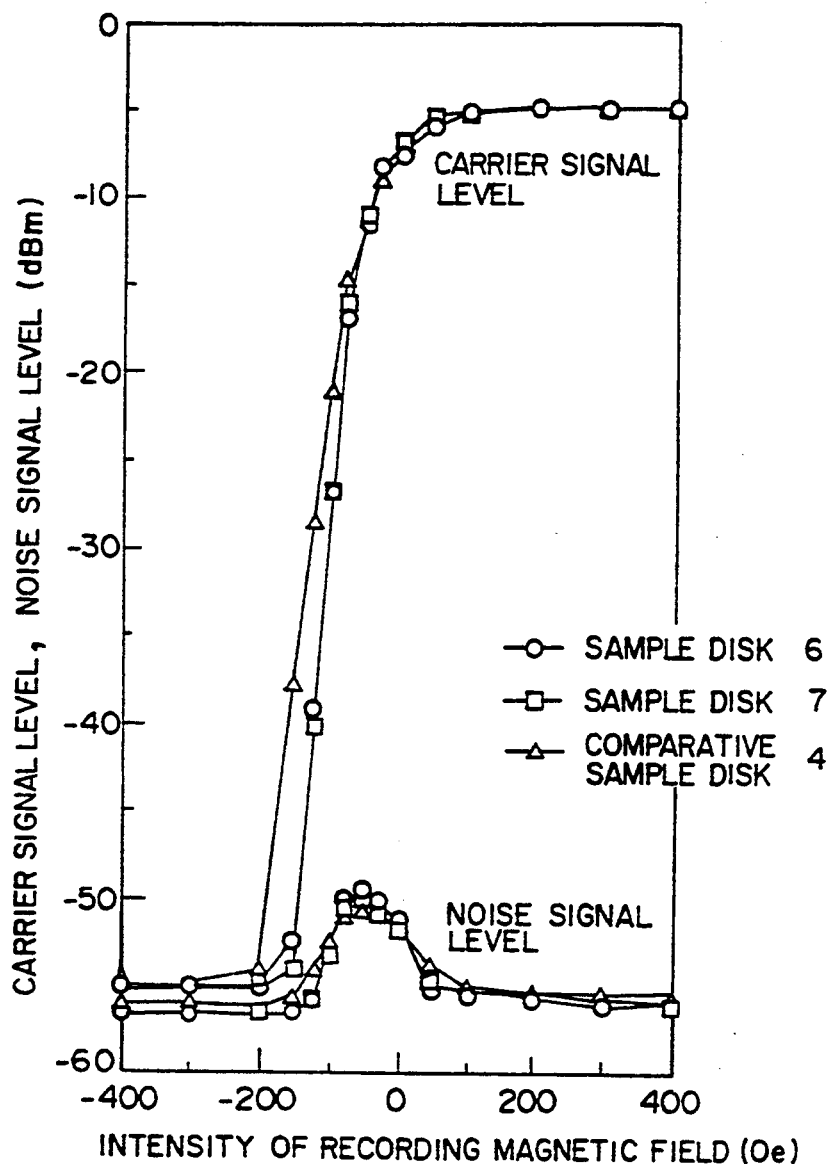
FIG. 6 is a graph showing the variation of carrier signal level and noise signal level with the intensity of an external recording magnetic field for magneto-optical disks each having a first dielectric layer consisting of a dense dielectric film and a porous dielectric film.
Figure 7:
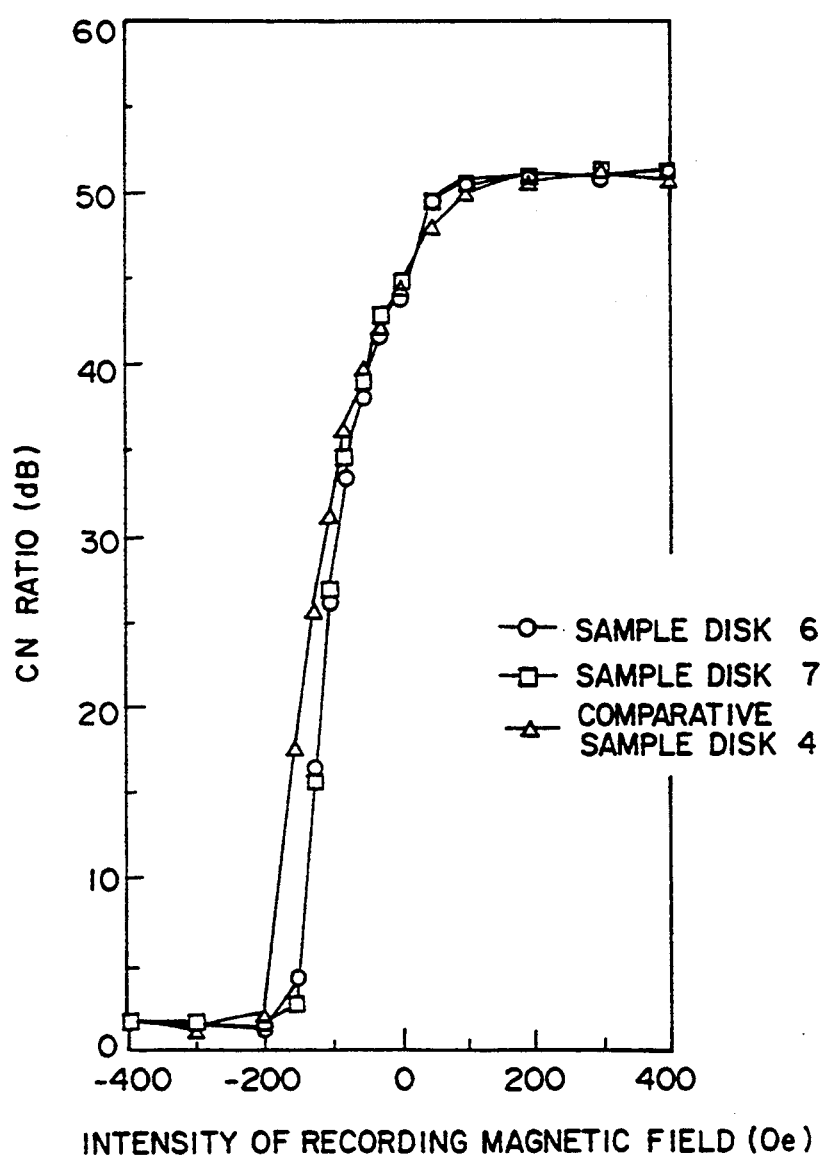
FIG. 7 is a graph showing the variation of CN ratio with the intensity of an external recording magnetic field for magneto-optical disks each having a first dielectric layer consisting of a dense dielectric film and a porous dielectric film.

The recording sensitivity of the sample disks 6 and 7, and the comparative sample disk 4 were examined. FIG. 6 shows the variation of carrier level and noise level with the intensity of the recording magnetic field and FIG. 7 shows the variation of CN ratio with the intensity of the recording magnetic field. In recording signals on the sample disks 6 and 7, and the comparative sample disk 4, recording frequency was 4.93 MHz, rotating speed of the disk was 2400 rpm, pulse width was 51 nsec and measuring radius was 30 mm.

As is obvious from FIGS. 6 and 7, the CN ratios for the magneto-optical disks provided with the sample film 1 or the sample film 2 as the upper dielectric film are high enough even if the intensity of the recording magnetic field is as low as a value on the order of 100 Oe, and these magneto-optical disks have practically acceptable recording sensitivity.

On the other hand, the CN ratios for the magneto-optical disks provided with the sample film 3 as the upper dielectric film are inadequate when the intensity of the recording magnetic field is on the order of 100 Oe, and the electromagnetic conversion characteristics of these magneto-optical disks are not satisfactory.

As is apparent from the foregoing description, it was proved through the experiments that the first dielectric layer consisting of the dense dielectric film capable of being etched at a relatively low etching rate and the porous dielectric film capable of being etched at a relatively high etching rate, and formed with the dense dielectric film capable of being etched at a relatively low etching rate formed on the side of the recording magnetic layer enhances the recording magnetic field sensitivity of the magneto-optical disk and reduces the internal stress of the first dielectric layer.

Thus, the present invention provides a magneto-optical disk with very high performance, capable of satisfactorily functioning with excellent recording/reading characteristics when applied to recording information thereon on either the optical modulation recording system or the magnetic modulation recording system.

What is claimed is:

1. A magneto-optical recording medium, comprising:
a transparent base plate;
a dielectric layer formed on one major surface of the transparent base plate;
a recording magnetic layer formed over the dielectric layer; and
the dielectric layer being etchable at an etching rate of equal to or less than 20 Å/min by a 5% hydrofluoric acid buffer solution at 25° C., said etching rate with the acid buffer solution at 25° C. defining a lower limit density of the dielectric layer which is sufficiently high to result in improved sensitivity of the magneto-optical recording medium by reducing a coercive force thereof.

2. A magneto-optical recording medium, comprising:
a transparent base plate;
a dielectric layer formed on one major surface of the transparent base plate;
a magnetic recording layer formed over the dielectric layer;
the dielectric layer comprising a two-layer laminate structure formed of a first dielectric film contiguous to the transparent base plate, and a second dielectric film contiguous to the recording magnetic layer;

the second dielectric film being etchable at an etching rate of equal to or less than 20 Å/min. by a 5% hydrofluoric acid buffer solution at 25° C., said etching rate with the acid buffer solution at 25° C. defining a lower limit density of the second dielectric film which is sufficiently high to result in improved sensitivity of the magneto-optical recording medium by reducing a coercive force thereof; and said first dielectric film being etchable at an etching rate of equal to or greater than 40 Å/min. by a 5% hydrofluoric acid buffer solution at 25° C., said etching rate under the stated conditions defining an upper limit density and sufficient porosity of the first dielectric film for reducing an internal stress of the second dielectric film so that both improved recording sensitivity and mechanical strength of the magneto-optical recording medium are simultaneously achieved.

* * * * *